United States Patent [19]
Umeda et al.

[11] Patent Number: 5,138,604
[45] Date of Patent: Aug. 11, 1992

[54] OPTICAL RECORDING METHOD HAVING TWO DEGREES OF REFLECTIVITY AND A DIFFRACTION GRATING OR HOLOGRAM FORMED INTEGRALLY THEREON AND PROCESS FOR MAKING IT

[75] Inventors: Kazuo Umeda; Yuji Kondo; Toshiharu Ishikawa, all of Tokyo, Japan

[73] Assignee: Dai Nippon Insatsu Kabushiki Kaisha, Tokyo, Japan

[21] Appl. No.: 445,638

[22] PCT Filed: Apr. 12, 1989

[86] PCT No.: PCT/JP89/00395
§ 371 Date: Dec. 7, 1989
§ 102(e) Date: Dec. 7, 1989

[87] PCT Pub. No.: WO89/09989
PCT Pub. Date: Oct. 19, 1989

[30] Foreign Application Priority Data
Apr. 12, 1988 [JP] Japan .................. 63-90028

[51] Int. Cl.⁵ .............................................. G11B 7/00
[52] U.S. Cl. ........................... 369/103; 235/457; 283/86; 283/91; 902/25
[58] Field of Search ............... 369/100, 103, 109; 235/457, 487, 488; 350/3.60, 3.61; 283/86, 9.4, 91, 98; 902/4, 25

[56] References Cited
U.S. PATENT DOCUMENTS

| | | | |
|---|---|---|---|
| 4,014,602 | 3/1977 | Ruell | 235/487 X |
| 4,501,439 | 2/1985 | Antes | 283/91 |
| 4,641,017 | 2/1987 | Lopata | 235/457 |
| 4,945,215 | 7/1990 | Fukushima et al. | 235/457 |

FOREIGN PATENT DOCUMENTS

| | | |
|---|---|---|
| 62-256248 | 11/1987 | Japan . |
| 62-259244 | 11/1987 | Japan . |
| 62-283383 | 12/1987 | Japan . |
| 62-283384 | 12/1987 | Japan . |
| 62-283385 | 12/1987 | Japan . |
| 63-20739 | 1/1988 | Japan . |
| 63-98689 | 4/1988 | Japan . |
| 63-98690 | 4/1988 | Japan . |

*Primary Examiner*—Robert L. Richardson
*Attorney, Agent, or Firm*—Wegner, Cantor, Mueller & Player

[57] ABSTRACT

An optical recording medium of the present invention has on a substrate information recording patterns (2) and (3) distinguishable by a difference in light reflectivity, and is characterized in that said information recording pattern (2) is comprised of a portion (2a) of high reflectivity and a portion (2b) of low reflectivity and at least a part of said information recording patterns is formed by a diffraction grating or hologram (3). Since such plural types of information can be formed at the same time and at high density, the present invention has a merit of its having excellent fake-proofness and its manufacturing process being simplified.

14 Claims, 16 Drawing Sheets

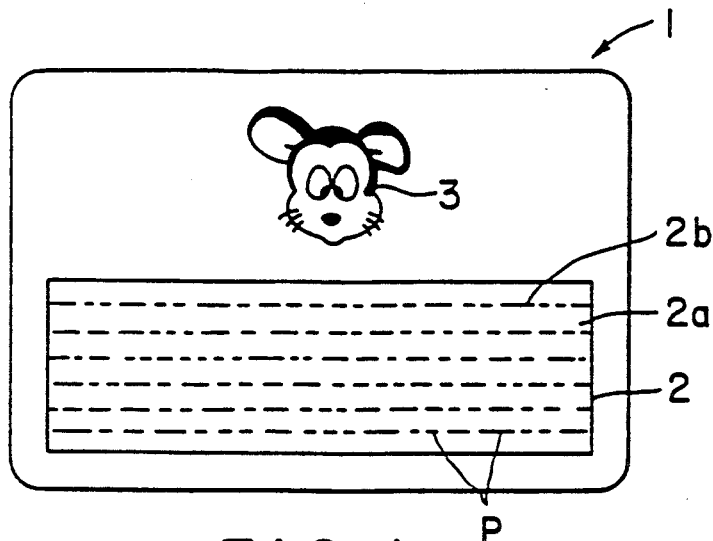
F I G. 1
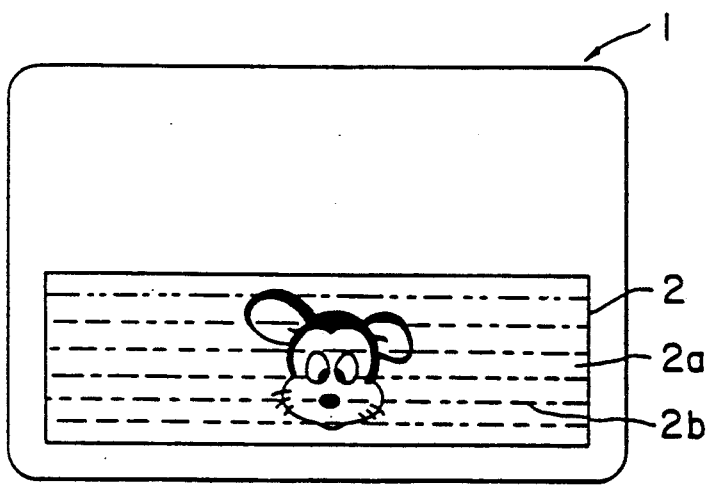
F I G. 2
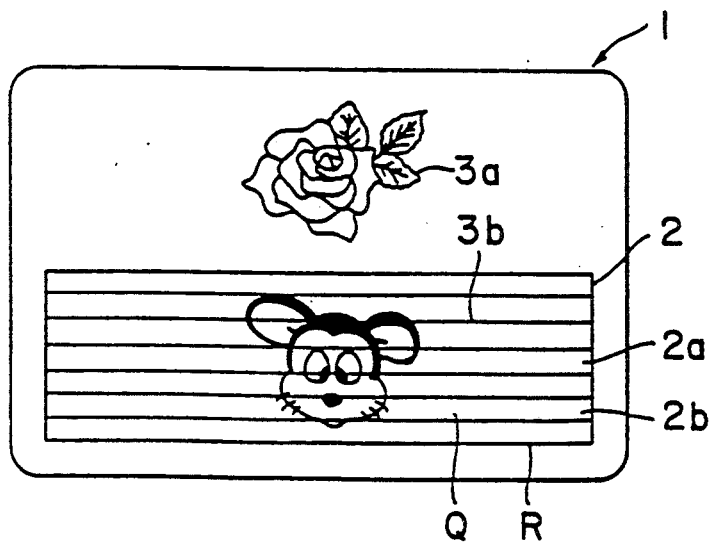
F I G. 3

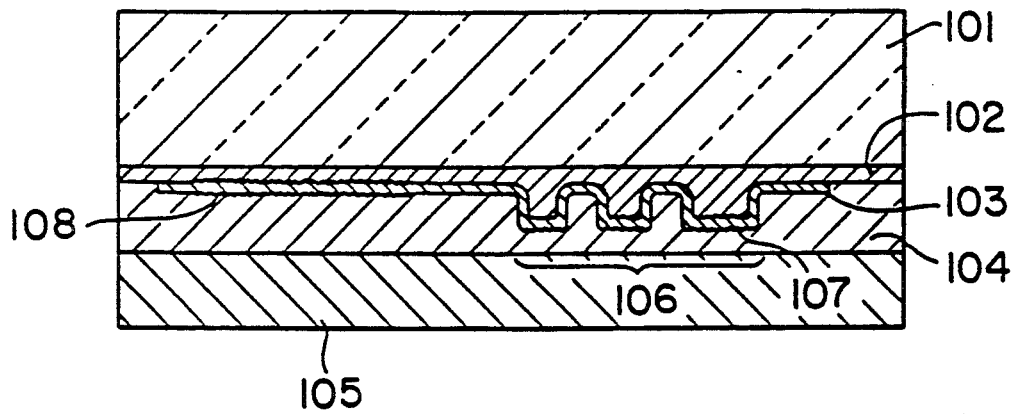
FIG. 7(A)
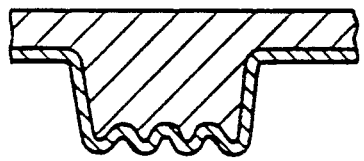   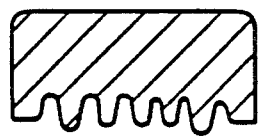
FIG. 7(B)          FIG. 7(C)
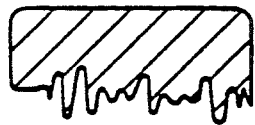   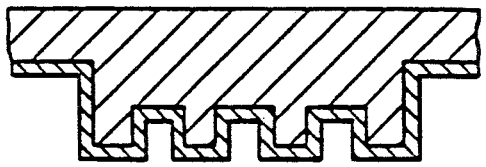
FIG. 7(D)          FIG. 7(E)

(f)

(g)

(h)

(i)

(a) EXPOSURE (b) DEVELOPMENT (c) TEMPLATING (d) CURING (e) SPUTTERING (f)

OPTICAL RECORDING METHOD HAVING TWO DEGREES OF REFLECTIVITY AND A DIFFRACTION GRATING OR HOLOGRAM FORMED INTEGRALLY THEREON AND PROCESS FOR MAKING IT

TECHNICAL APPLICATION FIELDS

The present invention relates to an optical recording medium capable of making an optical record of information and, more particularly, to optical recording media of such types as a read only memory (ROM) type for reading out information bits with laser beams, a direct read after write (DRAW) type capable of writing information with laser beams or an erasable or writable type and a process for making them.

BACKGROUND TECHNIQUES

Heretofore, magnetic recording materials have been primarily used as recording materials embedded in cards such as credit or bank cards. Such magnetic recording materials have the merit of being able to read and write information easily, but problems associated with them are that the information may be relatively easily falsified and high-density information recording is unachievable.

Recently, IC or optical cards are being under development with the recording and reproduction of high-density information in mind. In particular, optical cards relying upon optical recording/reproduction systems have an advantage of recording information at much higher densities over those to which conventional magnetic or IC systems are applied.

In this connection, the optical recording media or materials so far proposed for optical cards involve the following.

The recording medium shown in FIG. 19(A) as an example is a so-called ROM (read only memory) type of optical recording medium. In this instance, an optical card 50 is provided thereon with an optical recording medium comprising a portion 50 of high reflectivity and a portion 52 of low reflectivity, said portion 52 of low reflectivity defining an information recording bit.

FIG. 19(B) is a sectional view of the optical card 50. As illustrated, a transparent substrate 54 is provided thereon with a light reflecting material 55 corresponding to an information recording pattern by photolithography, while a substrate material 58 having a black printed layer 57 thereon is joined thereto through an adhesive layer 56, thereby forming the optical card 50. In this instance, therefore, the information is read out by detecting a difference in the light reflectivity between the light-reflecting material 55 and the printed layer 57.

FIG. 20 shows an example of the ROM type of optical recording medium disclosed in Japanese Patent Publication No. 58-48357. In this instance, a film 60 of a silver halogenide emulsion formed on a certain substrate material is subjected to pattern exposure corresponding to the information to be recorded and the developed, thereby forming an information recording bit 62 differing in light reflectivity from a surrounding portion 61.

FIG. 21 illustrates an example of the so-called DRAW (direct read after write) type of optical recording medium wherein no development treatment is needed after information has been written and the information can thus be read directly after writing. In this instance, a photopolymer 71 is formed on its one side into an irregular or modulated plane, along which an optical recording material 72 such as Te is provided in the form of a thin film. That film is bonded to a substrate 74 with a bonding agent 73, and a light transmitting acrylic resin 75 or the like is then laminated on the upper side of the photopolymer 71, thereby forming an optical recording medium.

Writing of information on such an optical recording medium may be achieved by scanning the modulated plane of the recording medium with a laser beam, 76 irradiated as illustrated in FIG. 22 to ensure that e.g., the convex portions are in alignment therewith and, thereafter, writing bit information on the convex portions.

FIG. 23 illustrates a DRAW type of optical recording medium disclosed in Japanese Patent Publication No. 58-48357. In this instance, a film 80 of a silver halogenide emulsion is formed on a substrate and then subjected to pattern exposure and development, thereby forming portions 81 and 82 different in light reflectivity from each other. After the position of the portion 81 has been ascertained by a difference in light reflectivity, bit information is written on the portion 81.

It has also been proposed to use such an optical recording medium as a card and to apply a separately prepared hologram onto the surface thereof.

However, such conventional optical recording media are all so relatively sophisticated to make that they are not always economical for mass-production or duplication. Nor are the obtained optical recording media satisfactory in terms of their shelf stability and durability over time.

Referring to the optical recording medium shown in FIG. 19 as an example, patterning of the light reflecting material is carried out by wet etching with a strong acid or the like. Washing and drying of the etching solution are then troublesome and time consuming. If washing is insufficient, then the completed optical recording medium is likely to suffer from accelerated corrosion with the passage of time, resulting in a reduction of its life. Usually, the etching solution does not only involve difficulty in its pH control but also poses a problem due to foreign matters contained therein.

A problem with the optical recording medium shown in FIG. 20 is that it is difficult to control the convex plane to be formed, because a predetermined minimum level of accuracy is necessarily imposed upon its height and width. This leads to another problem that the manufacturing process is so complicated that the cost increases.

The optical recording medium shown in FIG. 23 may possibly be easier to make than that shown in FIG. 20 in view of the fact that only the accuracy of the track width is critical. However, a cost problem again arises due to the need for a specific photographic material such as a special silver halogenide emulsion.

If the optical recording media prepared by any one of such processes is applied to an optical card, a problem then arises that the information recording pattern may be counterfeited by optical procedures, because it can be easily detected under a microscope or the like. However, although an optical card applied on its surface with a separately prepared hologram has an advantage of its hologram portion being indecipherable under an electron microscope, yet it is likewise less useful for fake-proof purposes, because the hologram can be duplicated by templating or optical procedures remaining exposed to the surface and easily delaminated.

DISCLOSURE OF THE INVENTION

The present invention overcomes the above-mentioned problems by providing an optical recording medium which can be easily made at lower costs, have fake-proofness and have a decorative effect by superimposing a separate type of information comprising a diffraction grating or hologram upon at least a part of a recording medium having an information recording pattern formed thereon without having any adverse influence upon the performance of said optical recording medium, and a process for making such an optical recording medium.

The present invention relates to an optical recording medium having a substrate provided thereon with an information recording pattern distinguishable by a difference in light reflectivity, which is characterized in that said information recording pattern is comprised of a portion of high reflectivity and a portion of low reflectivity and at least a part of said information recording pattern is comprised of a diffraction grating or hologram.

The present invention is also concerned with a process for making an optical recording medium having a substrate provided thereon with an information recording pattern distinguishable by a difference in light reflectivity, which is characterized in that said information recording pattern is formed by a portion of high reflectivity and a portion of low reflectivity and at least a part of said information recording pattern is formed into a diffraction grating or hologram.

In the optical recording medium of the present invention in the form of an optical card, an optical disk or the like, which has an information recording pattern area distinguishable by a difference in light reflectivity, separate information comprising a diffraction grating or hologram is designed to be recorded on at least a part of the recording medium, e.g., the portion of low reflectivity of the information recording pattern. Thus, the present recording medium is not only effective for preventing counterfeiting by optical procedures but is also so colorful that it may be used as a sort of ornament. Additionally, since the diffraction grating or hologram is formed in the same plane as the information pattern and embedded in the recording medium, it is impossible to read out the diffraction grating or hologram, even though the information pattern is possibly read out under an electron microscope. If read out optically, shading-off then occurs due to the embedding depth, thus making any complete reproduction impossible. The present recording medium used in the form of a card is unlikely to be damaged in severe environments.

BRIEF DESCRIPTION OF THE DRAWINGS

FIG. 1 is a view illustrating an example of the optical recording medium of the present invention in the form of a ROM type of optical card, FIG. 2 is a view showing an optical card having a hologram superimposed and recorded on its information recording area, FIG. 3 is a view showing an example of the optical recording medium of the present invention in the form of a DRAW type of optical card, FIGS. 7(A)–7(E) are sectional views of an optical card, FIG. 19(A) being a plan view and FIG. 19(B) a sectional view.

BEST MODE FOR CARRYING OUT THE INVENTION

Figure 4:
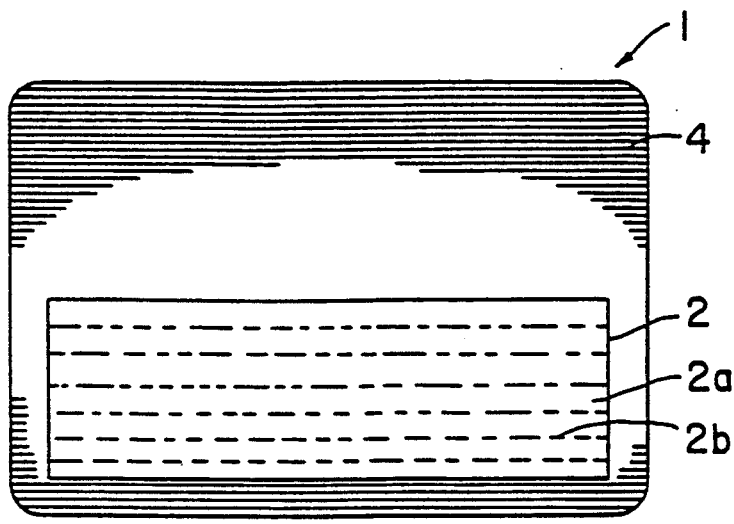
FIG. 4 is a view illustrating a ROM type of optical card having a diffraction grating formed on its whole surface.

Embodiments of the present invention will now be explained with reference to the drawings.

An example of the optical recording medium according to the present invention, which is provided as a ROM type of optical card, is illustrated in FIG. 1, wherein reference numeral 1 stands for an optical card, 2 an information recording area, 2a a portion of high reflectivity, 2b a portion of low reflectivity, P an information recording bit and 3 a hologram.

Referring to the optical card 1, the information recording area 2 comprises the portion 2b of low reflectivity with respect to the portion 2a of high reflectivity, and the hologram 3 is formed on an area different from the information recording area 2 in a manner described later.

FIG. 2 is a view of an optical card having a hologram 3 superimposed and recorded on its information recording area.

Referring to the optical card of FIG. 2, the hologram is formed on a portion 2b of low reflectivity of the information recording area, as will be described later, to make it possible to visually observe a decorative image. When such an image is read out with a laser beam, the hologram recorded portion is perceived as a black due to the diffraction or scattering of the laser beam, thus making a contribution to improvements in the readout capability of information with no adverse influence.

FIG. 3 is an example of the optical recording medium of the present invention, which is provided as a DRAW type of optical card. A hologram is superimposed and recorded not only on an information recording area but also on another area.

Referring to FIG. 3, a portion 2a of high reflectivity forms an optical recording track on which writing is possible with the use of light, while a portion 2b of low reflectivity defines a guide track. That guide track is then provided with a hologram. In connection with FIG. 3, it is noted that the optical recording tracks are formed alternately with the guide tracks. However, the number of the guide tracks may be reduced. A preformat having a partial portion of low reflectivity may also be formed.

FIG. 4 illustrates an example of a ROM type of optical card provided with a diffraction grating on its entire surface, so that it can be viewed in varied colors depending upon the angle of view, since color diffusion takes place in a direction perpendicular to the diffraction grating. As already explained with reference to FIG. 2, the diffraction grating functions as a diffraction or scattering element with respect to a laser beam for readout.

Figure 5:
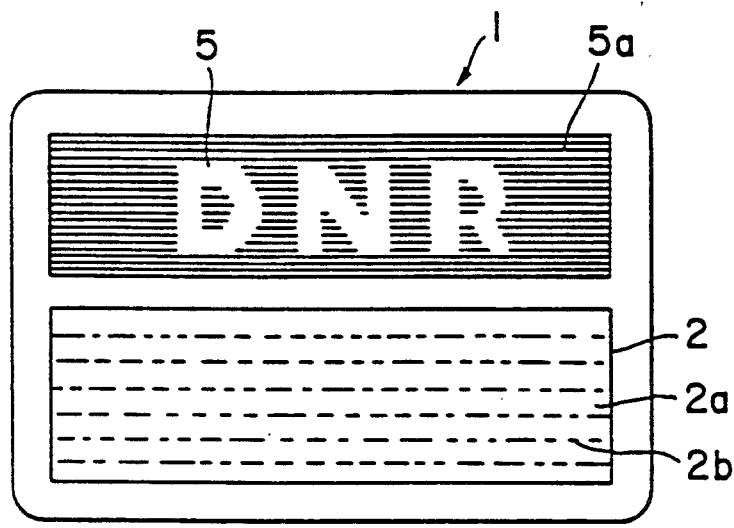
FIG. 5 is a view showing a pattern formed by varying the width of a pitch of a diffraction grating.

Referring to FIG. 5, portions 5a and 5b are formed by varying the pitch of a diffraction grating, thereby forming a pattern.

Figure 6:
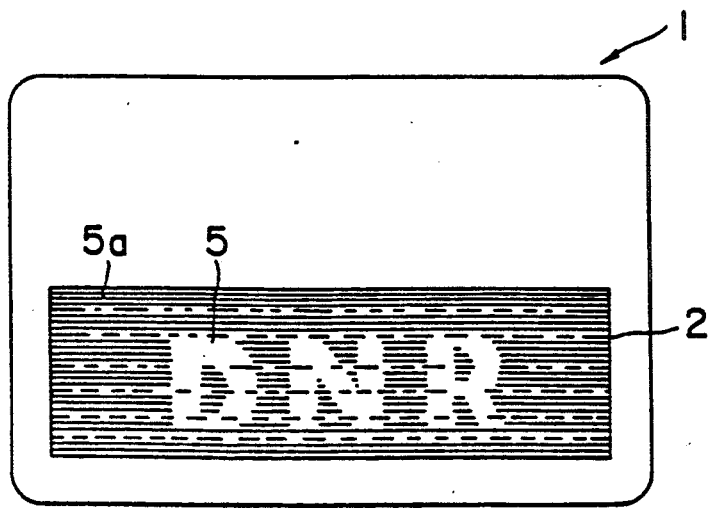
FIG. 6 is a view illustrating the pattern of FIG. 5 formed by varying the width of a pitch of a diffraction grating, which is superimposed and recorded on an information recording area.

Referring to FIG. 6, a pattern formed by varying the pitch of the diffraction grating of FIG. 5 is superimposed and recorded on an information recording medium. The pattern may be formed by a partial variation in the angle of the diffraction grating or overlapping parts of diffraction gratings having varied angles in addition to the variation in the pitch width of the diffraction grating.

FIGS. 7 are views showing the section of the above optical card; FIG. 7(A) being a vertically sectioned view of FIGS. 1 to 5, FIG. 7(B) an enlarged view of a finely modulated portion, FIG. 7(C) an enlarged view of a modulated portion in the case of a diffraction grating, and FIG. 7(D) an enlarged view of a modulated portion in the case of a hologram. FIG. 7(E) is a sectional view showing a modulated surface of another diffraction grating. In FIG. 7(A), reference numeral 101 represents a transparent substrate, 102 a templating agent or a photoresist layer, 103 a light reflecting or optical recording material layer, 104 an adhesive layer, 105 a support material, 106 an information pattern and 107 and 104 finely modulated portions.

The transparent substrate 101 may be formed of a light transmitting plastic film sheet such as, for example, a sheet or film of polymethyl methacrylate, polycarbonate, polyester, polyolefin, polystyrene or epoxy, a glass sheet or the like, and may have a thickness of about 0.2 to 0.7 mm. This transparent substrate provides a strength support for a recording medium, and cannot possibly be optically duplicated for the purpose of forging the finely modulated portion 108 due to its thickness.

It is noted that the transparent substrate may be provided on its outer surface with a cured layer, which may be formed of an UV or electron beam-curable resin.

The layer 102 includes on its surface (a) a portion modulated by holographic interference fringes, (b) a portion modulated by diffraction grating fringes or masking pattern exposure, (c) an information recording area comprising an information pattern 106 (of the DRAW or ROM type) having a finely modulated portion 107 (a portion of low reflectivity) formed by exposure through a rough surface provided by ground glass, etc., (d) a portion modulated by holographic interference fringes and (e) a portion 108 modulated by diffraction interference fringes or masking pattern exposure. This layer may be formed of an UV, electron beam or heat-curing resin or a photoresist in a manner to be described later. An information pattern to be recorded on this layer comprises, for instance, bits of about (5 to 15)×(5 to 20) μm for the ROM type and tracking and recording grooves, each of about 3 to 10 μm in width and about 10 to 20 μm in pitch, for the DRAW type, and the finely modulated portion formed further thereon have a pitch of about 0.3 to 1.0 μm for the above (a) and (b) and about 0.8 μm for the above (c) and a depth (from peak to trough) of about 0.1 to 5 μm. The thickness of the layer is about 10 to 40 μm in terms of the height of a pattern portion having the maximum thickness. The finely modulated portion 108 is similar to that applied to usual relief holograms, and various holograms are to be recorded, as will be described later. Thus, the finely modulated portion 108 (esp., the hologram) and the information pattern 106 are formed of the same material. With such an arrangement, it is impossible to separate the hologram from the information pattern, unlike conventional fake-proof means involving the application of a hologram label. Therefore, very high security is achievable.

It is noted that a primer layer may be provided between the templating agent and the transparent substrate, if required, to improve the adhesion therebetween. The primer layer may then be formed of resins such as UV, electron beam and heat-curable resins.

The layer 103 may be formed of a light reflecting or optical recording material to be set forth later in such a manner as will be described later, depending upon the ROM or DRAW type, and makes it possible to observe the finely modulated portion 108 (esp., the hologram) as a reflection type hologram.

The layer 104 is provided to bond the support or backing material to the transparent substrate 101 having the information pattern 106, etc. formed thereon, and may be formed of ordinary various types of pressure-sensitive, heat-sensitive and cold-setting adhesives as well as adhesives based on two-part curing, urethane, epoxy, vinyl chloride-acetate and other like systems.

In a sense, the support layer 105 serves to protect both the information pattern 106 and the finely modulated portion 108 and is in the form of a card when the recording medium is a card as an example. Used for this layer 105 is usually a plastic film sheet, which is preferably a vinyl chloride film in view of processings. The layer 105 may be printed or otherwise provided thereon with patterns or letters. Although varying depending upon the morphology of recording media, the film may have a thickness of about 0.1 to 0.5 mm for cards.

The thus formed finely modulated portion shown in FIG. 7(B) is in sine wave or blazed form for the diffraction grating, as shown in FIG. 7(C) and in a form shown in FIG. 7(C) for the hologram.

If the finely modulated portion is formed by mask pattern exposure, it is then possible to provide it in the form of such a regular square wave as shown in FIG. 7(E). In this case, the border between the regions of high and low reflectivities becomes so sharp that a pattern of higher accuracy is obtainable.

As explained above, the diffraction grating or hologram is recorded along with the information pattern according to the present invention. In this connection, it goes without saying that micro- and macro-patterns are simultaneously recorded. Thus, even though the micro-pattern can be observed under an electron microscope, the macro-pattern cannot. Since the macro-pattern is embedded in the same plane as the information pattern, as will be explained later, counterfeiting can be prevented by reason that its complete reproduction is not possible even by optical readout, since shading-off takes place due to the recording depth.

How to make the diffraction grating and hologram will now be explained briefly.

Figure 8A:
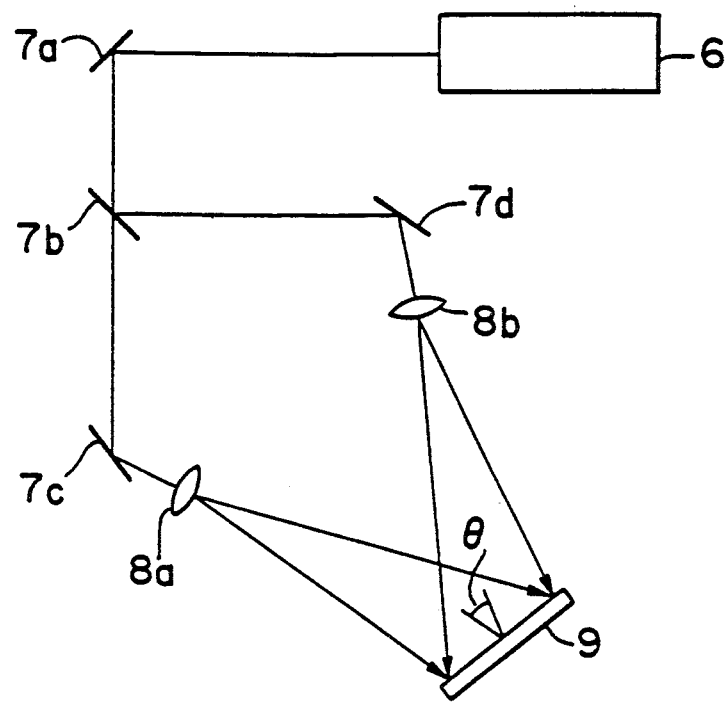
FIGS. 8(A)–8(B) are views illustrative of how to record interference fringes.

Referring to FIG. 8(A) illustrating how to make the diffraction grating, light from a laser 6 is reflected off a mirror 7a and split into two beams by a half mirror 7b. The beams are then expanded through beam expanders 8a and 8b into two luminous fluxes, which are formed by interference into a diffraction grating on a photosensitive material 9. In this connection, it is to be noted that the larger the angle $\theta$ of intersection of the two luminous fluxes, the smaller the pitch of the grating and vice versa. Hence, the pitch width of the diffraction grating may be selected by the variation of $\theta$.

Figure 8B:
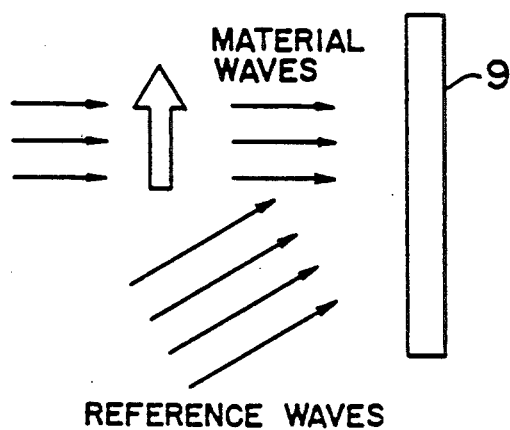

Referring then to FIG. 8(B) illustrating how to record the hologram, the photosensitive material 9 is irradiated with material and reference waves, whereby the amplitude and phase information of the material waves are recorded on the photosensitive material 9.

It is understood that the holograms usable in the present invention include a Fresnel hologram to be recorded using as material waves Fresnel's diffraction waves transmitting through or reflected off a material and as reference waves parallel or diffuse light located at any suitable interval from a photosensitive material; a Fraunhofer hologram to be recorded when waves transmitting through or reflected off a material become Fraunhofer's diffraction waves; an image hologram to be recorded such that a material to be recorded is imaged on a photosensitive material by an imaging optical system such as lenses; a rainbow hologram making the reproduction of white light possible; and a Lippmann hologram designed to form interference fringes in a direction normal to a photosensitive material by irradiating it with material and reference waves from the opposite direction. Required for duplication are relief types of holograms other than the Lippmann hologram.

The optical recording medium according to the present invention may also be comprised of a type of hologram (a laser beam reproduction type of hologram) at least a part of which can reproduce its image by the irradiation of a laser beam. Such a hologram is more effective for fake-proof purposes, since no image is focussed by usual white light and the hologram can be reproduced by the irradiation of laser beams.

Reference will now be made to main constitutional materials of the optical recording medium according to the present invention.

Substrates

Usable as the substrates are various materials heretofore known in the art. Especially for light transmitting materials, resins such as polymethyl methacrylate (PMMA), polycarbonate, polyester, epoxy resin, polyolefin and polystyrene or glass may be used. Details of such substrates will again be explained in connection with Preparations (I) to (VIII) to be described later.

Light Reflecting Materials

As the light reflecting materials used for the above ROM type, use may be made of any materials which are different in reflectivity from the substrate used. To this end, use may be made of, e.g., materials of high reflectivity such as metals, for instance, Al, Ti, Mn, Fe, Co, Ni, Cu, Zn, Se, Mo, Ag, Cd, In, Sn, Sb, Te, Pt and Au, or their alloys or compounds, such oxides or nitrides as represented by $TiO_2$ and $TiN$, thin films of organic pigments and so on.

Optical Recording Materials

The optical recording materials used for the above DRAW type may include those based on, for instance, metals (Ta, Bi, In, Al, C/Al, Cr/Al, Zn/Al, Si, GeSmS, etc.), chalcogens (Te, Te-As, Te-Se, Te-Se-As, Te-$CS_2$, Te-C, Te composites, As-Se-S-Ge, etc.), oxides ($TeO_x$, $GeO_x$, $MoO_x$, $VO_2$, etc.) and organic substances (thin pigment films+resins, Ag+polymers, thermoplastic resins, Cu-Pc/Te, etc.).

It is noted that for such types of optical recording materials that erasure and writing are feasible, use may be made of materials which form a film by the irradiation of light, whose interatomic order varies reversibly and which are of varied light reflectivities, for instance, Te-As, Te-Se, Te-Se-As, Te-$CS_2$, Te-C, As-Se-S-Ge and so on.

Of the above materials used as the DRAW types of optical recording media in the present invention, particular preference is given to a material obtained by laminating a first layer comprising an oxide of tellurium expressed by a general formula $TeO_x$, wherein x is a positive real number, on a second layer comprising an oxide of tellurium having a general formula $TeO_y$ wherein y is again a positive real number, provided that x <y. Usually, $0<x\leq1.5$ and $0.5\leq y\leq2$ hold for the above general formulae.

The optical recording material layer comprising such oxides of tellurium as mentioned above excels particularly in stability and weather resistance in the form of a DRAW type recording layer, and is superior in recording and reproduction sensitivity when an optical recording medium is formed as a closed type optical card.

When making such an optical recording material layer as mentioned above, the above first and second layers may be easily prepared by reactive sputtering. Alternatively, the layers having such composition as mentioned above may be prepared by the evaporation of tellurium on a substrate by vacuum deposition simultaneously with the irradiation of said substrate with an ion beam comprising an oxygenous gas. In any way, the optical recording material layer may be prepared at relatively low cost by simple and rapid techniques.

How to make the optical recording medium according to the present invention will now be specifically explained. It is understood that the diffraction grating or hologram may be recorded on any suitable area of the recording medium in the present invention. In what follows, however, reference will be made to embodiments wherein the diffraction grating or hologram is formed on an information recording area to form a portion of low reflectivity.

Preparation (I)

According to a first embodiment of the process for making an optical recording medium having thereon an information recording pattern comprised of portions of low and high reflectivities, said portion of low reflectivity is formed by surface modulation to be achieved by the recording of a diffraction grating or hologram corresponding to such an information recording pattern. The portion of low reflectivity is formed by forming interference fringes corresponding to this information recording pattern through the following steps.

(i) Step of forming a photoresist layer on a substrate,
(ii) Step of carrying out first (patterning) exposure with respect to said photoresist layer through a mask corresponding to the information recording pattern, (iii) Step of performing second exposure (for surface modulation to form interference fringes) with respect to the photoresist layer subjected to the first exposure for recording the diffraction grating or hologram, and (iv) Step of developing the photoresist layer subjected to the second exposure to obtain an information recording pattern comprised of the portion of low reflectivity having the interference fringes on its surface.

The present process may include an additional step of laminating the aforesaid light reflecting or optical recording material layer on the whole surface or a partial surface of the substrate in such a way that the portion of low reflectivity, as obtained above, is covered thereby.

Figure 9:
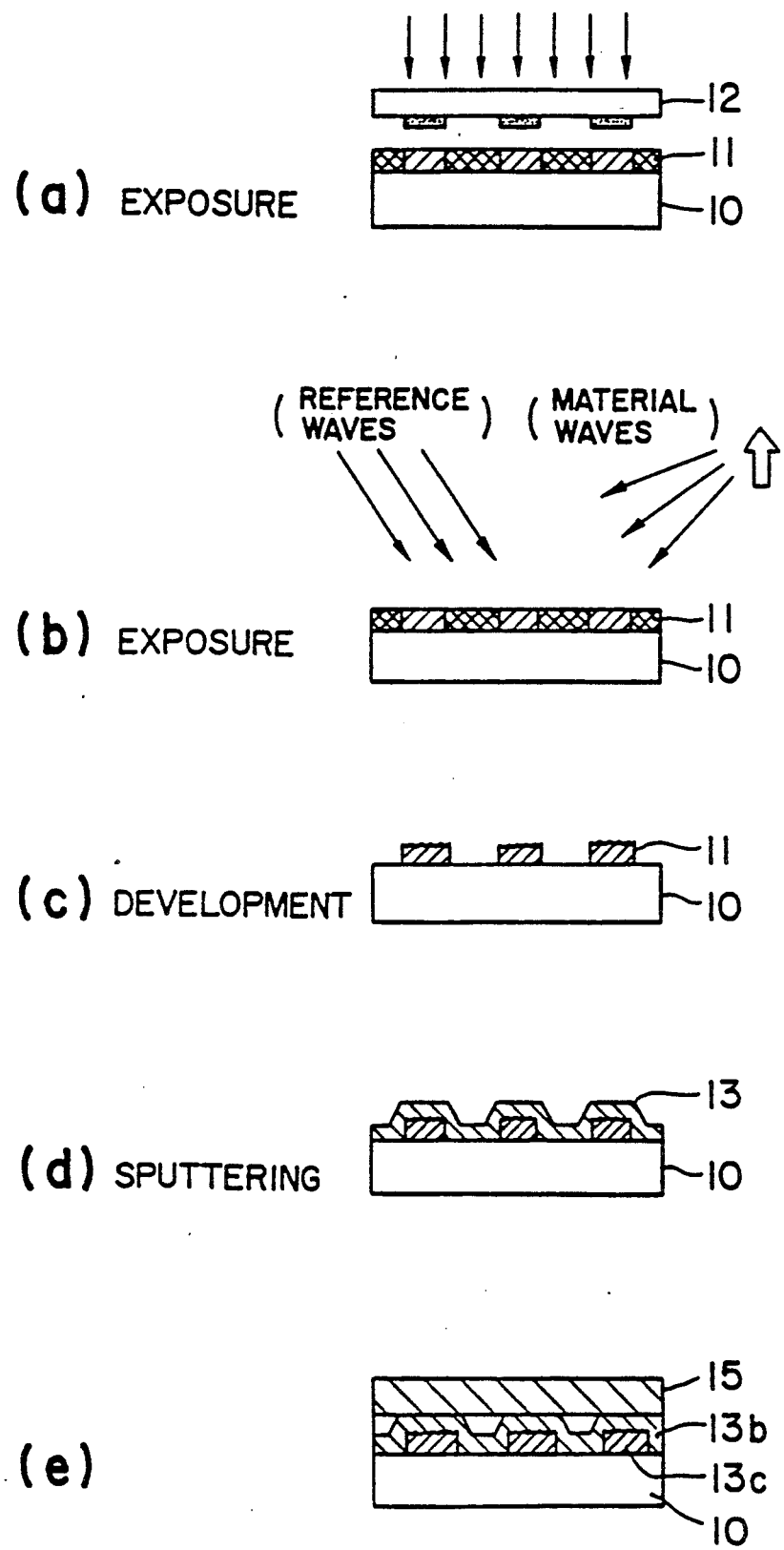
FIGS. 9 to 16 are views for illustrating examples of the process for making the optical recording media of the present invention.
Figure 9:
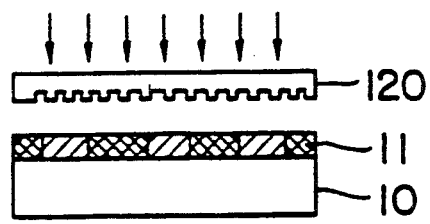
Figure 9:
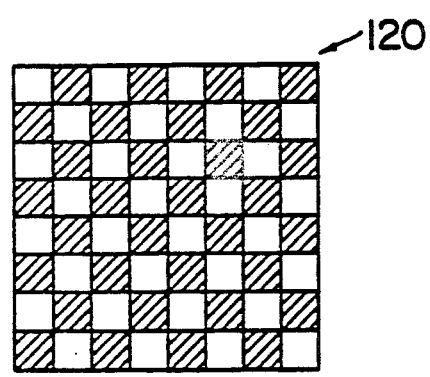
Figure 9:
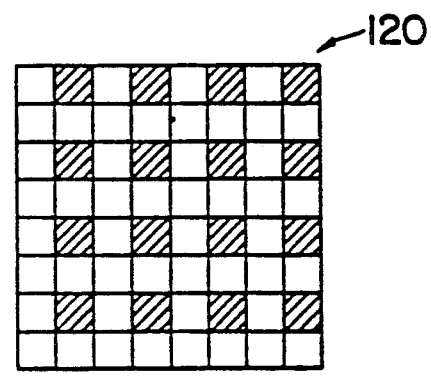
Figure 9:
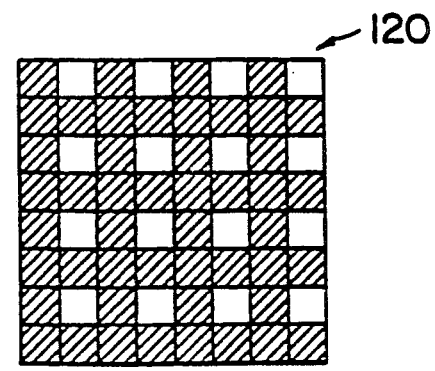

FIG. 9 is sectional views illustrating a specific example of the above process. Referring specifically to this figure, a photoresist layer 11 is first uniformly coated on a light-transparent substrate 10 at a thickness of 4000 to 20,000 Å with the use of a rotary photoresist coater. Then, a photomask 12 formed corresponding to an information recording pattern is superimposed on the photoresist layer 11 with the use of a mask aligner, followed by the first (patterning) exposure (FIG. 9(a)).

Next, the photoresist layer 11 is again exposed to light (for surface modulation by forming interference fringes) for recording a diffraction grating or hologram, as illustrated in FIG. 9(b).

Subsequently, the photoresist layer 11 is developed, as depicted in FIG. 9(c). Where a positive type of photoresist is used, some portion of the photoresist upon which ultraviolet rays strike flows off, while another portion upon which ultraviolet rays do not remain intact, so that the pattern of the photomask 12 is transferred onto the light-transparent substrate 10. The photoresist layer 11 having its surface modulated is thus provided in the form of either an information recording bit P, shown in FIG. 1, or a guide track, shown in FIG. 3, at a width of about 5 $\mu$ and a pitch of about 15 $\mu$ for instance.

Then, a thin film of a light reflecting or optical recording material 13 is formed by vapor deposition, sputtering or other chemical technique, as shown in FIG. 9(d).

Finally, a substrate 15 of polyvinyl chloride or the like is bonded to the thin film 13, as sketched in FIG. 9(e), to obtain an optical recording medium having a portion 13b of high reflectivity and a portion 13c of low reflectivity. It is to be understood that an additional development step may be provided between the above exposure steps (a) and (b) to subject the photoresist to exposure for the formation of interference fringes once it has been left, or the order of the exposure steps (a) and (b) may be reversed. In the above instance, the substrate 10 is described as light-transparent, but while the substrate 15 is made light-transparent, light may be irradiated from the substrate 15 for readout. In this case, the substrate 10 need not be a light-transparent material.

In the present invention, the diffraction grating may be formed by exposure through a mask having a pattern, regular but finer than the photomask 12, as illustrated in FIG. 9(f), in place of applying such an exposure technique as depicted in FIG. 9(b). Referring to the configuration of the mask 120 in this case, when the diameter of the information recording bit is 10 $\mu$m, its pitch may be less than that. At a pitch diameter of 0.1 $\mu$m or below, the effect by modulation is rather limited. Hence, preference is given to a range of 0.3 to 3 $\mu$m. FIGS. 9(g), (h) and (i) illustrate examples of the configuration of the mask pattern for forming the above diffraction grating.

Referring to the example of FIG. 9(g) for instance, one information bit includes 200 concaves or convexities at a pitch diameter of 0.5 $\mu$m. In the present invention, it is understood that the mask may assume configurations other than such grating configuration.

Such a mask pattern for exposure as stated above may also be prepared by ordinary mask making techniques used for photolithography. For instance, a chrome mask of any desired pattern may be prepared by coating a resist for EB (an electron beam) on a chrome substrate and exposing it to any desired pattern with an EB drawer, followed by development etching. To add to this, a mask having a fine pattern may be prepared by dry etching or using a silver salt film.

When exposure is carried out with such a photomask as mentioned above in the present invention, it is possible to form varied types of information at the same time by exposing an information recording pattern to light through a single mask having both (a) a pattern of the size of an information bit defining said information recording patterns and (b) a regular pattern smaller than the size of an information bit defining said information recording pattern. Referring to the example of FIG. 9, it is possible to form visual information and bit information at the same time by single exposure with a mask in which such fine patterns as depicted in FIGS. 9(g) and (h) are combined with the photomask 12 of FIG. 9(a).

In addition, the mask 12 may also be superimposed on the mask 120 for exposure through an additional mask of microsize such as a picture pattern. Furthermore, a photomask separate from the mask 120 may be provided and disposed on a zone different from that of said mask 120 for exposure purposes. Still furthermore, exposure may be carried out with a mask in which patterns of such configurations or pitches as mentioned above are formed.

With light incident from the light-transparent substrate 10, the light is much reflected off the portion 13b of high reflectivity, while it is less reflected off the portion 13c of low reflectivity due to the presence of the photoresist modulated on its surface by the interference fringes formed. When the ROM type of card is made, the information recording bit P shown in FIG. 1 is formed on the portion 13c of low reflectivity by using the aforesaid light reflecting material as the layer 13. By making the DRAW type of card, on the other hand, the optical recording track shown in FIG. 3 can be formed on the portion 13b of high reflectivity, while forming the guide track on the portion 13c of low reflectivity.

The photoresist 11 used in the above process may be formed of materials based on orthoquinonediazide/-novolak, azide/rubber, p-diazophenylamine.paraformaldehyde condensates, azide polymers, polyvinyl cinnamate, polycinnamiliden vinyl acetate and the like.

With the ROM type of optical recording medium made in such a manner as mentioned above, the information recording bit of low light reflectivity will be read out by a line sensor (e.g., a CCD line sensor) or a laser beam. It is noted that the guide track is not necessarily used for the ROM type of optical recording medium, and that a train of information recording bits may be used as a guide track.

Figure 17:
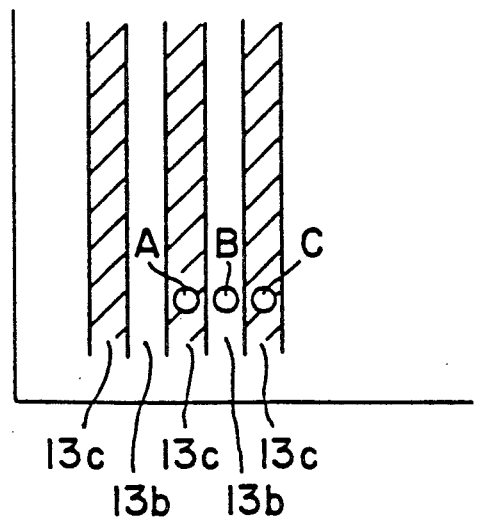
FIG. 17 is a view illustrating a system for writing on the optical recording medium of the present invention.

The light reflectivities of the optical recording and guide tracks 13b and 13c in the DRAW type of optical recording medium made as mentioned above were measured with a white light lamp of 400 to 700 nm As a result, it was found that the optical recording track 13b had a light reflectivity of, e g., about 50%, while the guide track 13c had a light reflectivity of, e.g., about 10%. When bit information is written on the optical recording medium, two or three beams are used. In an example where three beams are used, however, a difference in light reflectivity between the guide and optical recording tracks 13c and 13b is detected by both outer beams A and C, as illustrated in FIG. 17, whereby the positions of the guide tracks 13c and 13c are positioned to keep them in place. In that state, the bit information is written on the optical recording track 13b by the middle beam B. Hence, this system is easier to control than the single beam system. The guide tracks need not be disposed alternately with the optical recording tracks 13b, and the number thereof may be reduced. In this case, the distance between the guide and optical recording tracks 13c and 13b may be calculated to position the optical recording tracks 13b for the purpose of writing the bit information.

Preparation (II)

According to a second embodiment of the process for making an optical recording medium having thereon an information recording pattern comprised of portions of low and high reflectivities, said portion of low reflectivity is formed by surface modulation to be achieved by the recording of a diffraction grating or hologram corresponding to such an information recording pattern. The portion of low reflectivity surface-modulated corresponding to such an information pattern is formed through the following steps.

(i) Step of forming a photoresist layer on an original sheet substrate finely modulated on its surface by the recording of a diffraction grating or hologram, (ii) Step of carrying out patterning exposure with respect to said photoresist layer through a mask corresponding to the information recording pattern, and (iii) Step of developing the photoresist layer subjected to the patterning exposure to expose to view the surface of the substrate finely modulated thereon depending upon the information recording pattern, thereby obtaining an optical recording medium having the information recording pattern formed thereon.

The present process may include an additional step of laminating the aforesaid light reflecting or optical recording material layer on the whole surface or a partial surface of the substrate in such a way that the portion of low reflectivity, as obtained above, is covered thereby.

Figure 10:
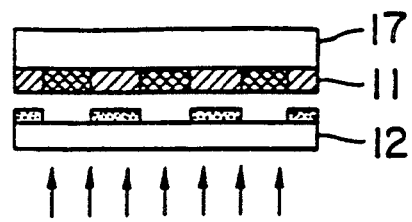
Figure 10:
Figure 10:
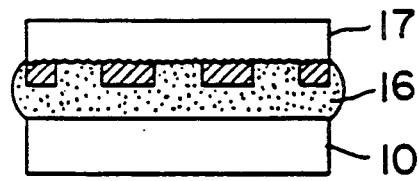
Figure 10:
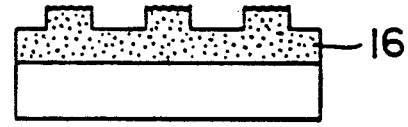
Figure 10:
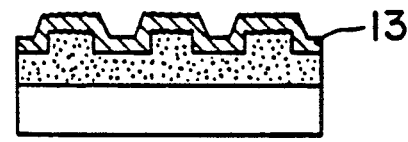
Figure 10:
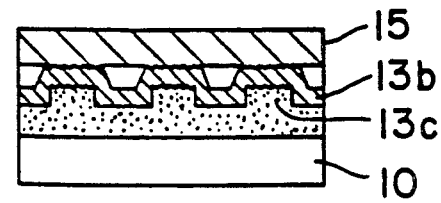

FIG. 10 is sectional views illustrating a specific example of the above process. Referring specifically to this figure, a photoresist layer 11 is first uniformly coated on a glass plate 17 finely modulated on its surface by the recording of a diffraction grating or hologram at a thickness of 4000 to 20,000 Å with the use of a rotary photoresist coater. Then, a photomask 12 formed corresponding to an information recording pattern is superimposed on the photoresist layer 11 with the use of a mask aligner, followed by exposure to light. Subsequently, the photoresist layer 11 is developed, as depicted in FIG. 5(b). Where a positive type of photoresist is used, some portion of the photoresist upon which ultraviolet rays strike flows off, while another portion upon which ultraviolet rays do not remain intact, so that the pattern of the photomask 12 is transferred onto the glass plate 17. Thus, apertures or openings of about 5 μm in width and about 15 μm in pitch are formed on the photoresist layer 11 to expose the modulated surface of the glass plate 17 to view in patterned form, thereby obtaining an optical recording medium according to the present invention.

In the present invention, it is further possible to duplicate optical recording media, using the above optical recording medium as an original sheet.

Referring specifically to FIG. 10(c), the original sheet prepared in FIG. 10(b) is laminated on a light transmitting substrate 10 through a templating agent 16 comprising a molding resin of, for instance, an ionizable radiation or heat-curing resin, followed by pressing on a pressing machine. Thereafter, the templating agent is removed from the original sheet as shown in FIG. 10(d), or it is cured in such a state as shown in FIG. 10(c) by given curing means, followed by releasing. Thus, an information recording bit of, e.g., about 5 μm in width and about 20 μm in length and having surface-modulated convexities is formed on the templating agent 16.

As shown in FIG. 10(e), a thin film of a light reflecting or optical recording material 13 having a thickness of 500 to 1000 Å is then formed by vapor deposition, sputtering or other chemical techniques. Next, a substrate 15 of polyvinyl chloride or the like is bonded to the thin film with the use of adhesives, etc., as shown in FIG. 10(f), thereby producing an optical recording medium having a portion 13b of high reflectivity and a portion 13c of low reflectivity. When the ROM type of card is to be made as is the case with the specific example of FIG. 9, the information recording bit P shown in FIG. 1 is formed on the portion 13c of low reflectivity by using a light reflecting material as the layer 13. When the DRAW type of card is to be prepared, on the other hand, the optical recording track shown in FIG. 3 is formed on the portion 13b of high reflectivity by using an optical recording material as the layer 13, with the guide track formed on the portion 13c of low reflectivity.

In the above specific example, a resinous portion 16 is present on the portion 13b of high reflectivity. It is understood, however, that such a portion is not always needed and sufficient results are obtained, if a surface-modulated resin is present on the portion 13c of low reflectivity.

The templating resins used in the above process may include the following ones.

(A) Ionizable radiation-curing resins (1) Electron beam-curing type of resins

Polymerizable oligomers and monomers having an acryloyl group such as urethane acrylate, oligoester acrylate, trimethylolpropane triacrylate, neopentyl glycol diacrylate, epoxy acrylate, polyester acrylate, polyether acrylate and melamine acrylate, to which a mono- or poly-functional monomer containing a polymerizable vinyl group such as acrylic acid, acrylamide, acrylonitrile and styrene are added.

(2) Ultraviolet-curing resins

Resin compositions of the above (1) to which photopolymerization initiators, sensitizers or desired additives are added.

(B) Heat-curable resins

Epoxy, melamine, unsaturated polyester, urethane, urea, amide and phenol/formalin resins.

Preparation (III)

In the manufacturing process according to a third embodiment, the information recording pattern may be formed as follows.

(i) Step of forming a photoresist layer on a substrate having its surface finely modulated by the recording of a diffraction grating or hologram.

(ii) Step of subjecting said photoresist layer to patterning exposure through a mask corresponding to an information pattern. And, (iii) Then, development and etching are carried out to selectively modulate or unmodulate a portion of said substrate free from said resist layer, thereby obtaining an optical recording medium having an information recording pattern formed thereon.

Figure 11:
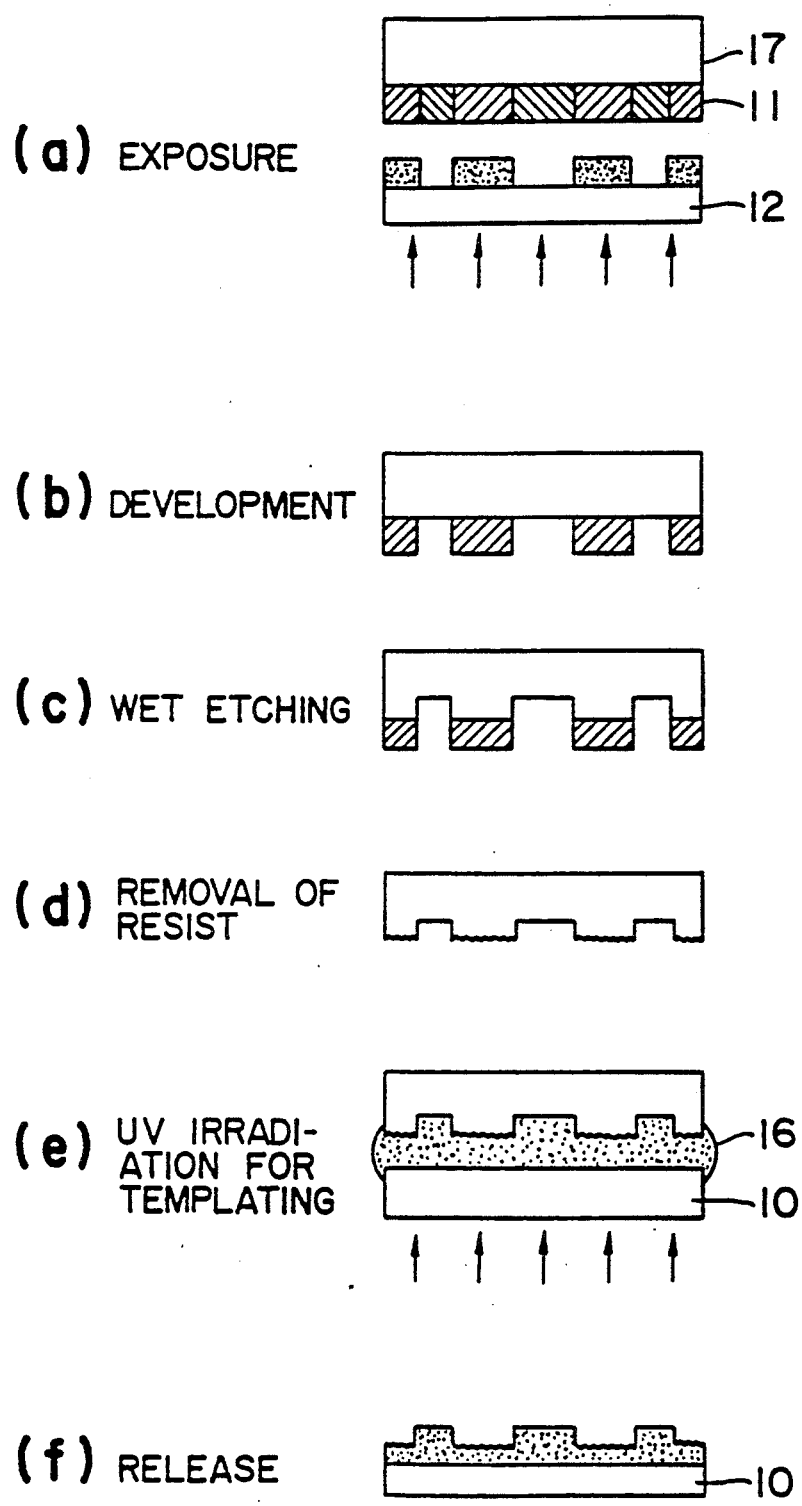
Figure 12:
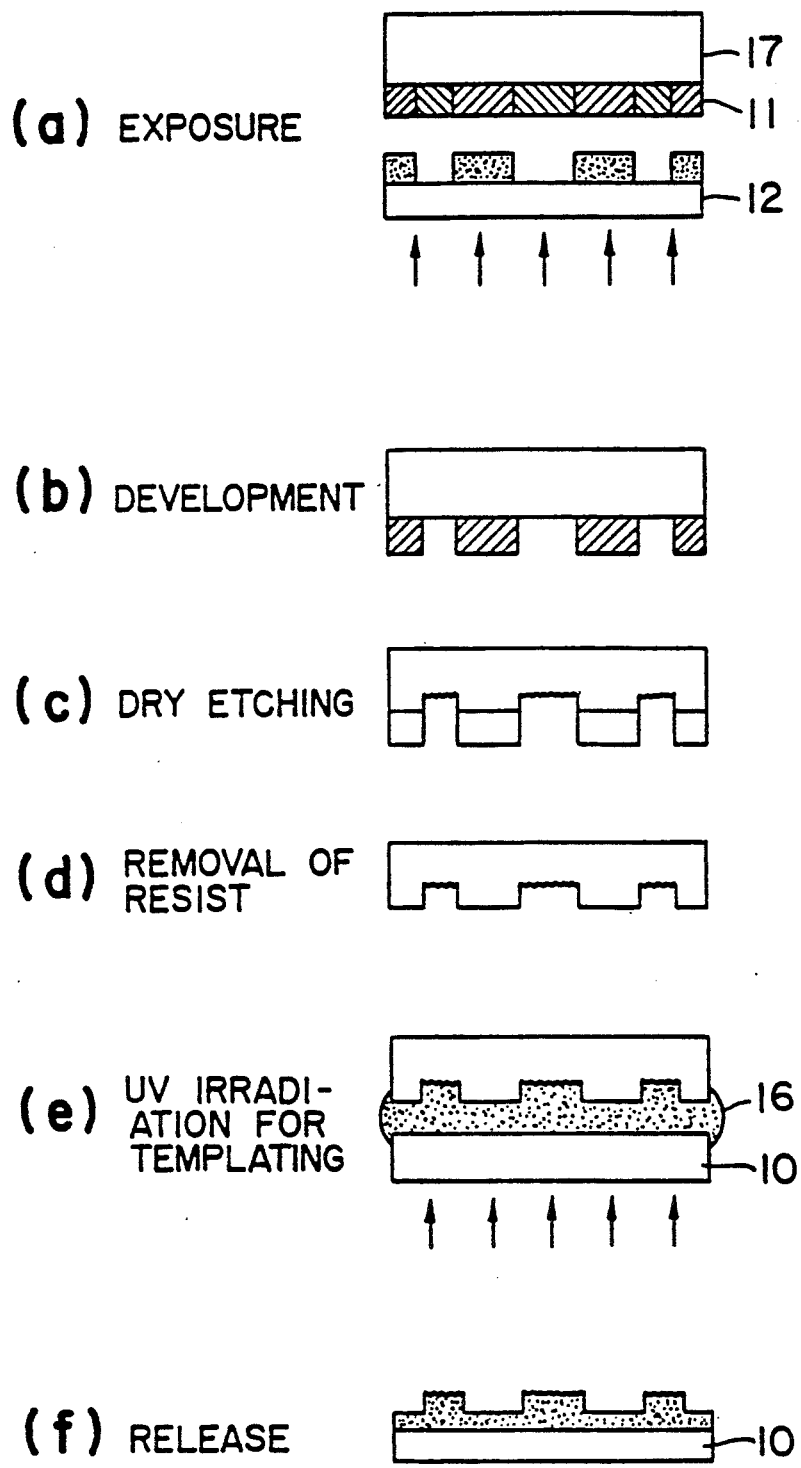

FIGS. 11 and 12 illustrate other examples of the templating type similar to the specific example of FIG. 10. Such specific examples have a merit of improving the durability of the pressing die used.

Referring to FIG. 11, a photoresist layer 11 is coated on a glass plate 17 finely modulated by the recording of a diffraction grating or hologram. Thereafter, a photomask 12 is superimposed on the photoresist layer 11, followed by exposure (FIG. 11(a)). Then, after the development of the photoresist layer 11 (FIG. 11(b)), wet etching is conducted for 1 minute to 1 hour with an etching solution for glass such as an aqueous solution of ammonium fluoride/nitric acid (FIG. 11(c)), thereby smoothing the modulated surface of an opening portion of the glass plate 17 free from the photoresist. To this end, use may be made of any other etching solution for glass which can smooth the surface to be etched. No particular limitation is imposed upon the depth of etching, as long as smoothing is achieved. The resulting product may be used as an optical recording medium in this state.

The resist is then removed, as shown in FIG. 11(d). Thereafter, the original sheet prepared as mentioned with reference to FIG. 11(d) is laminated on a light-transparent substrate 10 through a templating agent 16 comprising an ionizable radiation- or heat-curing resin to be described later, followed by pressing on a pressing machine. Thereafter, the assembly is irradiated with an electron beam or ultraviolet rays or heated for curing. As illustrated in FIG. 11(f), the original sheet is released from the templating agent 16, whereby, for instance, an information recording bit modulated on its surface by interference fringes is formed on a part of the templating agent 16. This is processed through steps similar to those shown in FIGS. 10(e) and (f) to make an optical recording medium.

Examples of the aforesaid templating agents 16 are given below.

(A) Ionizable radiation-curing resins (1) Electron beam-curing type of resins

Polymerizable oligomers and monomers having an acryloyl group such as urethane acrylate, epoxy acrylate, polyester acrylate, polyether acrylate and melamine acrylate, to which a mono- or poly-functional monomer containing a polymerizable vinyl group such as acrylic acid, acrylamide, acrylonitrile and styrene are added.

(2) Ultraviolet-curing resins

Resin compositions of the above (1) to which photopolymerization initiators are added.

(B) Heat-curable resins

Epoxy, melamine, unsaturated polyester, urethane, urea, amide and phenol/formalin resins.

The specific example of FIG. 12 is different from that of FIG. 11 in that the glass plate 17 is modulated on its surface by the etching of FIG. 12(c) to form an information recording bit or guide track portion. In this case, etching may be carried out in either the dry or wet fashion. Dry etching may be conducted with $CF_4$ plasma, HF gas or the like such that the surface of glass to be etched is modulated, while wet etching may be performed with not only the etching solution used in the example of FIG. 11 but also a solution having a high hydrofluoric acid concentration such as a solution based on acidic ammonium fluoride/mineral acids.

Figure 13:
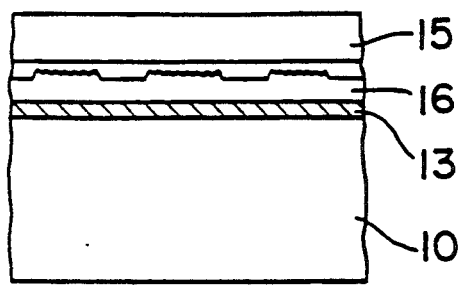

Unlike the specific examples of FIGS. 10 to 12 wherein the light reflecting or optical recording material 13 is formed on the templating agent 16, a specific example of FIG. 13 is provided to form a light reflecting or optical recording material 13 on a substrate 10 by vapor deposition, sputtering or plating and laminate thereon a templating agent 16 modulated on its surface and a substrate 15.

In the specific examples of FIGS. 10-12 and 14, read-out or writing may be feasible from the side of either the substrate 10 or the substrate 15. In the instant example, however, readout or writing is possible only from the side of the substrate 15.

Preparation (IV)

Figure 14:
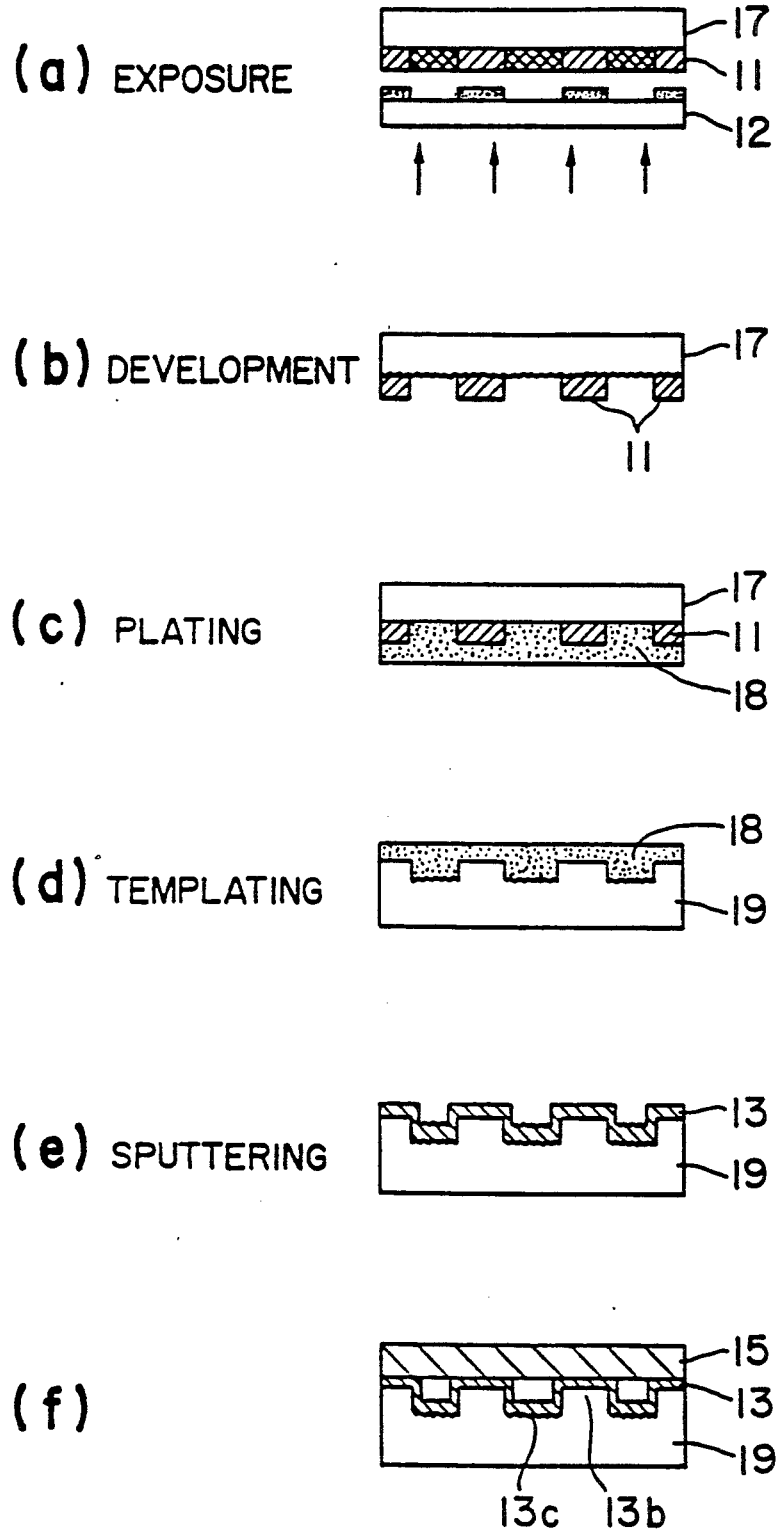

A specific example shown in FIG. 14 will now be explained. In the instant example, a plating step is provided before the templating step of FIG. 10(c), as shown in FIG. 14(c), thereby forming a metallized layer 18 to cover a photoresist layer 11 thereby. Afterwards, said metallized layer 18 is removed to form thereon a pattern of an information recording bit or guide track modulated on its surface by the recording of a diffraction grating or hologram. Then, the resulting original sheet is pressed onto a molded resin 19, as illustrated in FIG. 14(d). Subsequently, the original sheet is removed from the molded resin 19, as depicted in FIG. 14(e), in order that interference fringes are formed on the molded resin 19 to form thereon an information recording pattern modulated on its surface. Finally, a thin film layer of a light reflecting or optical recording material 13 is formed on that pattern.

Figure 15:
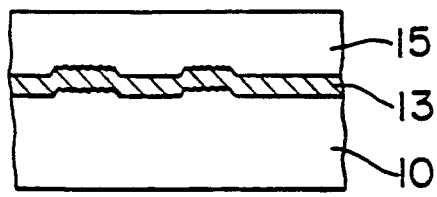

It is to be understood that while the metallized layer 18 is used as the original sheet for pressing, a precisely etched metal sheet may be employed as a pressing sheet. With the above metal sheet, it is also possible to obtain a molded resin having on its surface an information recording pattern modulated by the recording of a diffraction grating or hologram by the application of injection molding. Alternatively, as illustrated in FIG. 15, the light reflecting or optical recording material 13 may be formed on the substrate 10 by vapor deposition, sputtering or plating to emboss the pattern thereon using said metal sheet as a pressing die, followed by the lamination of the substrate 15.

Preparation (V)

In the present invention, the portion of low reflectivity modulated corresponding to an information pattern may also be formed through such steps as described below and illustrated in FIG. 16A.

Figure 16:
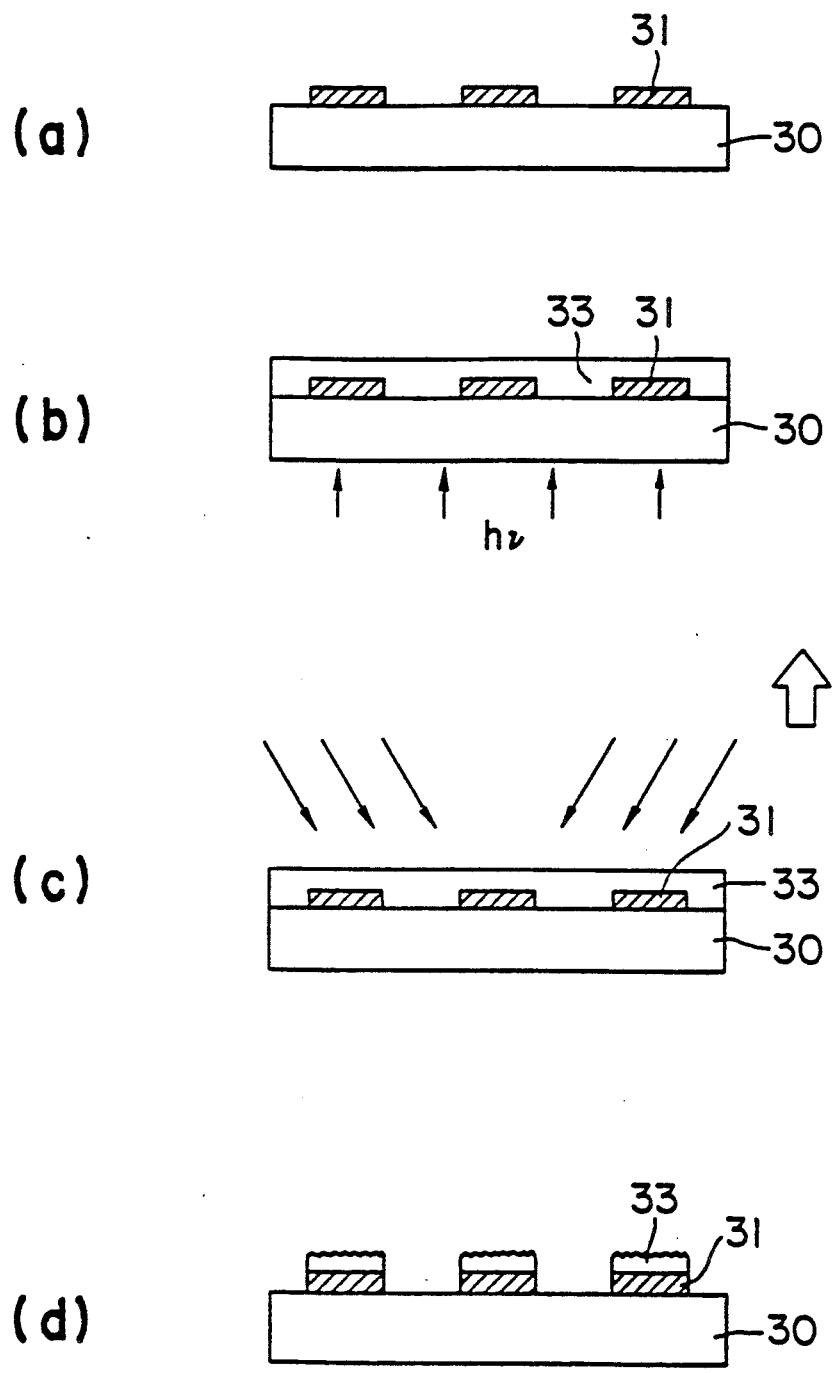
Figure 16:
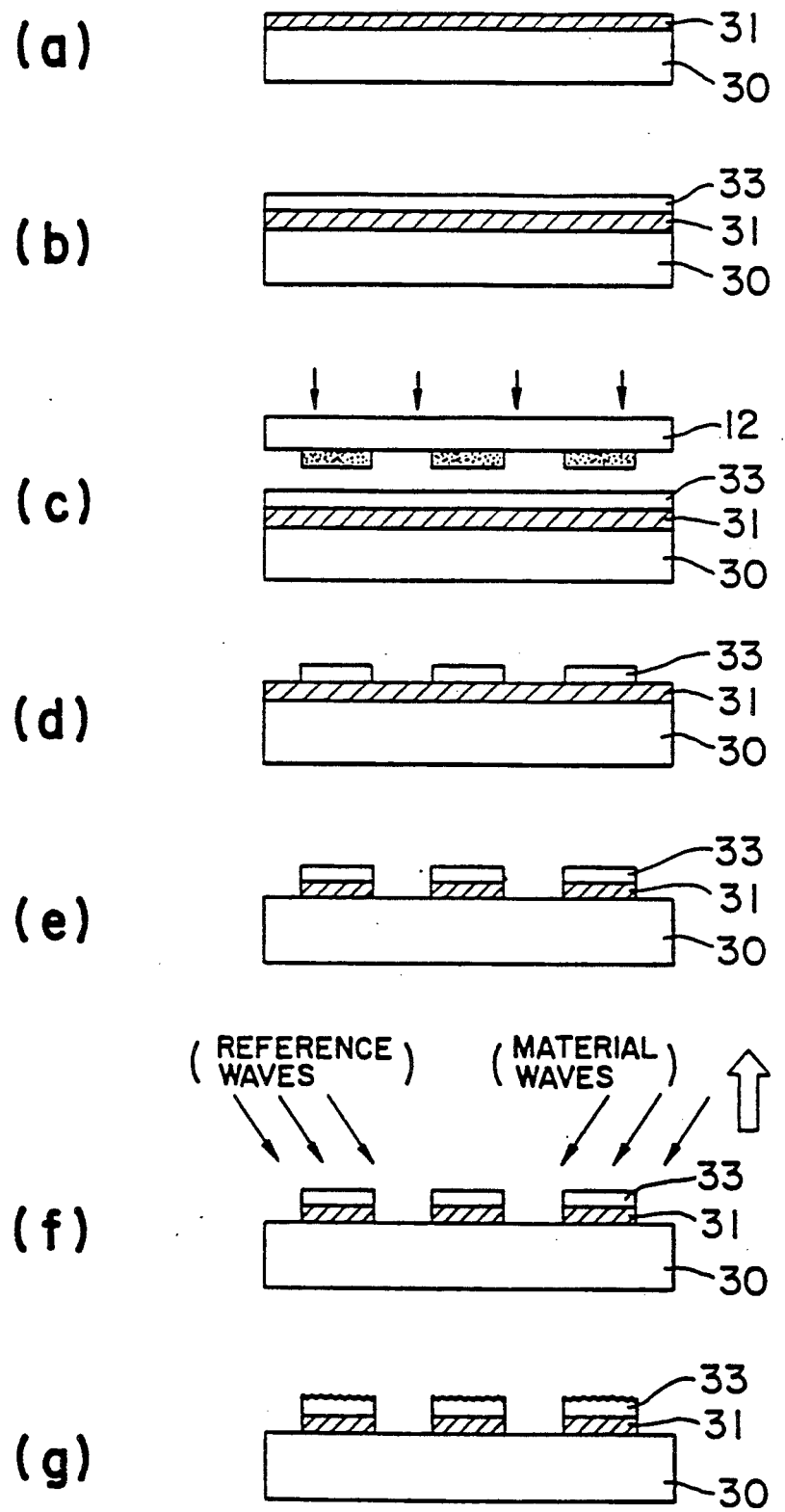

(i) Step of forming on a light-transparent substrate 30 a mask pattern 31 corresponding to an information recording pattern (FIG. 16A(a)), (ii) Step of forming a photoresist layer 33 on said light-transparent substrate 30 to cover said mask pattern 31 thereby (FIG. 16A(b)), (iii) Step of carrying out first (patterning) exposure from the side of said light-transparent substrate 30 opposite to the photoresist layer 33 (FIG. 16A(b)), (iv) Step of subjecting the photoresist layer 33 subjected to the first exposure to second exposure (for modulation) from the side of said photoresist layer 33 for the purpose of recording a diffraction grating or hologram (FIG. 16A(c)), and (v) Step of developing the photoresist layer 33 subjected to the second exposure, thereby obtaining an information recording pattern comprising a portion of low reflectivity having interference fringes by which its surface is modulated.

Referring more specifically to the above process, a light-transparent substrate of, e.g., glass is formed on its surface with a mask pattern comprising a thin film pattern of a desired metal, e.g., Cr. Coated on the Cr mask pattern is further a positive type of photoresist by a spinner, which is then prebaked at 90° to 100° C. for about 30 seconds.

From its back side on which the light-transparent substrate is located, the thus formed photoresist layer is (patterning) exposed to light for 8 seconds by a super high-pressure mercury lamp (4 kW) spaced 80 cm away therefrom. Next, the photoresist layer is subjected on its surface to the second exposure (for modulation by the formation of interference fringes) for the purpose of recording a diffraction grating or hologram. Finally, this is developed for about 30 minutes with a given developer such as an alkali one to obtain an information pattern of such a structure that the resist layer modulated on its surface is formed on the Cr mask pattern.

The above process is very favorable in that any variation in close alignment is eliminated. In other words, the above process makes it possible to increase the accuracy of the resist layer pattern by the exposure for modulation and so satisfactorily impart a finished modulation to the surface of the resist layer.

This specific example will now be explained in more detail.

(1) A Cr sputtered mask was prepared by forming on a glass plate a predetermined pattern having a guide track width of 5 $\mu$m and an information track width of 10 $\mu$m by photolithography, and was then coated thereon with a positive type of photoresist under the following conditions.

Spin Coating: at 2000 rpm for 20 seconds.
Resist: Sypray Microposite 1400.
Thickness: 1.5 $\mu$m.

(2) After coating, prebaking was carried out at 90° C. for 20 minutes.

(3) Then, patterning exposure was performed from the glass side of the Cr mask under such conditions as specified below.

Super High-Pressure Mercury Lamp: at 4 kW (80 W/cm) for 8 sec.

(4) Subsequently, the exposure for modulation was conducted from the resist side of the Cr mask by the recording of a diffraction grating or hologram.

(5) After the exposure, 60-second immersion in a Sypray Microposite developer was carried out, followed by water washing for development.

(6) Post-baking was performed at 90° C. for 20 minutes, thereby obtaining a modulated original sheet.

In what follows, duplication will now be explained.

(7) Duplication of Mother Mask

Materials

Substrate: A substrate of transparency and good flatness such as 12 m/m acrylic plate. It is to be noted, however, that use may be made of any material having such properties as mentioned.

Mother Mask Resin: An UV-curable resin (SEL-XA manufactured by Moroboshi Ink Co., Ltd.—a resin composed mainly of a polyester acrylate oligomer and a neopentyl glycol diacrylate monomer and containing a photopolymerization initiator (Irga Cure 184)).

Viscosity: 100 cps. It is to be noted, however, that other UV-curable resins having a viscosity of as low as about 50 to 1000 cps may be used with the addition of a release agent, etc., depending upon release properties.

How to Duplicate

The mother mask resin is inserted in between the transparent substrate and the modulated original sheet prepared at (6), followed by pressing at 5 kg/cm$^2$ for 30 seconds. After one-minute exposure to light from an UV 2 kW super high-pressure mercury lamp spaced 400 m/m away therefrom, the transparent substrate is removed from the modulated original sheet to duplicate a pattern on the transparent substrate.

(8) Duplication

Material

As the resin for duplication, use is made of an UV-curable resin (for three bonding, SS-120 and based on urethane acrylate) having a viscosity of 80 to 100 cps. It is to be noted, however, that some other UV-curable resin may be used, if it has a low viscosity.

How to Duplicate

A resin for duplication (SS-120) was inserted between the primer side of a transparent substrate obtained by forming a UV-curable primer (Three Bond R-428-20) on a 0.4-mm thick acrylic plate at a thickness of 1 $\mu$m and the UV-curable resin side of the mother mask prepared at (8), followed by pressing at 5 kg/cm$^2$ for 30 seconds. After one-minute exposure to UV (from a 2-kW high-pressure mercurty lamp) at a distance of 400 m/m, the transparent substrate was then removed from the mother mask to duplicate a pattern on the transparent substrate side. It is noted that the UV-curable resin layer had a thickness of 25 $\mu$m.

(9) Formation of Optical Recording Material Layer

Formed was a laminated TiO$_x$ and TeO$_y$ film, wherein x = 0.5 and y = 1.8, under the following conditions. For instance, use was made of a reactive sputtering unit.

(i) TeO$_x$ Film

A chamber is evacuated to a degree of vacuum of about $1 \times 10^{-5}$ Torr.

(2) Ar and $O_2$ gases are admitted into the chamber at the following flow rates to adjust the degree of vacuum to $5 \times 10^{-3}$ Torr.

Ar: 3 cc/min., and $O_2$: 0.5 cc/min.

(3) Initiation of Sputtering

Power Feed: 100 W.

Film-Forming time: 20 seconds.

(ii) $TeO_x$ Film (1) The same as above.

(2) Ar: 2 cc/min., and $O_2$: 1.5 cc/min.

(3) Power Feed: 100 W.

Film-Forming time: 20 seconds.

(10) How to Laminate

A card substrate printed on a 0.3-m/m substrate formed of, e.g., vinyl chloride, PET or the like was laminated on the substrate prepared at (5) and having a recording layer through a bonding agent ((a two-part curing type based on urethane and manufactured by Toray Co., Ltd. under the trade name of UH-12060C) to obtain a DRAW type of optical card that is one example of the present invention.

Alternatively, it is possible to obtain a ROM type of optical card as follows.

Similar steps (1) to (6) as stated above were applied, provided that the pattern of (1) was changed to a bit pattern of $10 \times 20$ μm.

The steps (7) and (8) were carried out in similar manners as mentioned above, provided that a 0.4-μm polycarbonate plate was used as the transparent substrate.

With respect to the light reflecting material layer of (9), the following procedures were applied.

After (9), the light reflecting material layer was carried under the following conditions to form it on the UV-cured resin layer. With a d.c. type of bipolar sputtering unit, a layer of 500 Å in thickness was formed (Al sputtering).

The laminating step of (10) was carried out in a similar manner as was the case with the DRAW type to obtain the ROM type of optical card.

Preparation (VI)

In the present invention, the portion of low reflectivity modulated corresponding to an information pattern may be formed through the steps described below and illustrated in FIG. 16B.

(i) Step of forming a metal mask layer 31 on a light-transparent substrate 30 (FIG. 16B(a)), (ii) Step of forming a photoresist layer 33 on the surface of said metal mask layer 31 (FIG. 16B(b)), (iii) Step of carrying out first (patterning) exposure from the side of said photoresist layer 33 through a photomask 12 (FIG. 16B(c)), (iv) Step of developing the photoresist layer 33 subjected to the first exposure, thereby forming the photoresist layer 33 corresponding to an information recording pattern (FIG. 16B(d)), (v) Step of etching an additional metal mask layer 31, thereby forming a laminate of the photoresist layer 33 and metal mask layer 31 corresponding to the information recording pattern (FIG. 16B(e)), (vi) Step of subjecting the photoresist layer 33 to second exposure (for modulation by the formation of interference fringes) for the purpose of recording a diffraction grating or hologram (FIG. 16B(f)), and (vii) Step of further developing the photoresist layer 33 subjected to the second exposure, thereby obtaining an information recording pattern comprising a portion of low reflectivity having its surface modulated.

Materials used for the above light transmitting substrates, mask layers and so on may be similar to those mentioned with reference to the above Preparation (V).

Preparation (VII)

For its own sake, the optical recording medium according to the present invention has a merit of its manufacturing process being simplified. In addition, the present optical recording medium is made more suitable for mass-production and duplication on industrial scales by making use of the following procedures.

In the manufacturing process according to this embodiment, the optical recording medium obtained by the aforesaid manufacturing processes (I) to (VI), which has the information recording pattern comprising the portion of low reflectivity modulated on its surface by the recording of the diffraction grating or hologram, is used as an original sheet for modulation as an example. From such an original sheet for modulation, optical recording media can be duplicated by templating pressing, etc.

According to the present invention, it is further possible to prepare a mother mask from the above original sheet for modulation and then use this mother mask as an original sheet for mass-duplication for the purpose of obtaining optical recording media by templating.

The process for making optical recording media through such a mother mask is especially useful when the original sheet for modulation is formed of mechanically or chemically fragile materials.

Referring to the optical recording media obtained by templating using as the original sheet for modulation such a mother mask as mentioned above, the substrates may be laminated on their entire or partial surfaces with a light reflecting or optical recording material layer to cover the portions of low reflectivity of the optical recording media.

Figure 18:
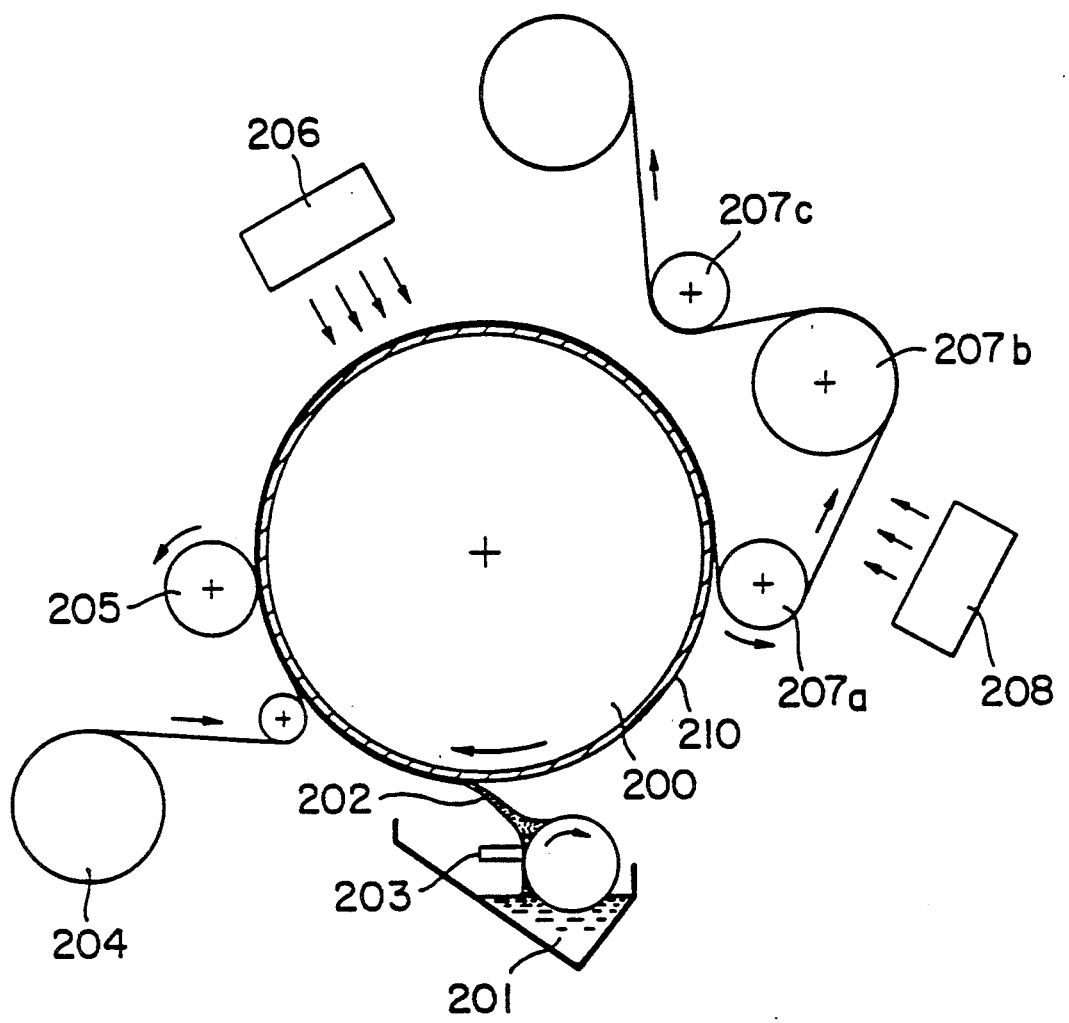
FIG. 18 is a sectional view of equipment used in the process for making the optical recording medium of the present invention.
Figure 19:
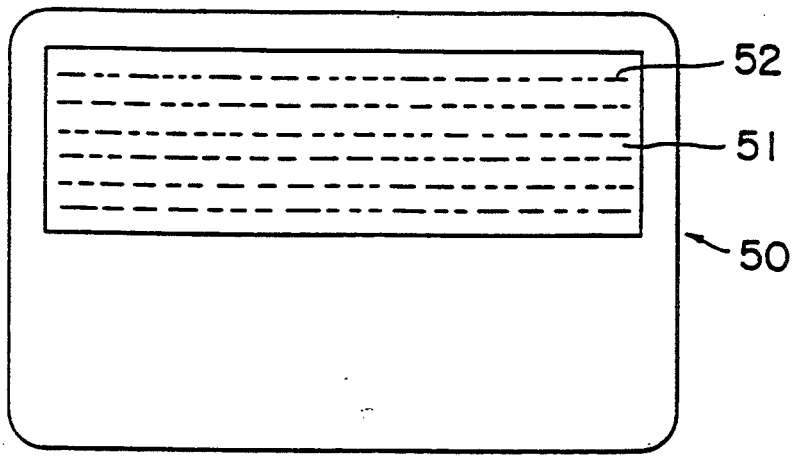
FIGS. 19(A)–19(B) are views showing one example of a conventional optical card.
Figure 19:
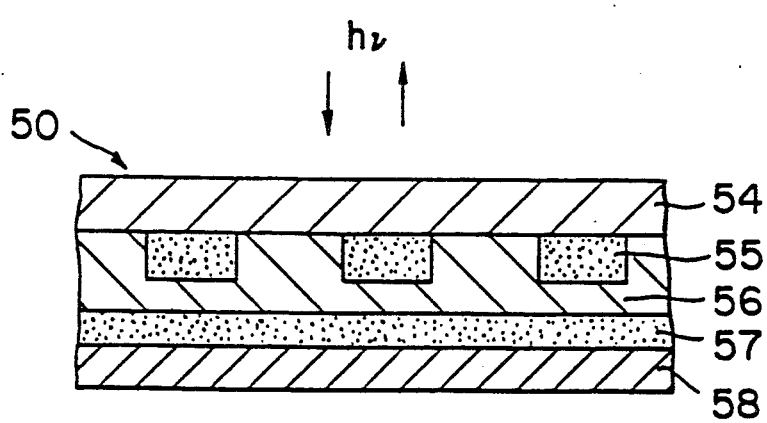
Figure 20:
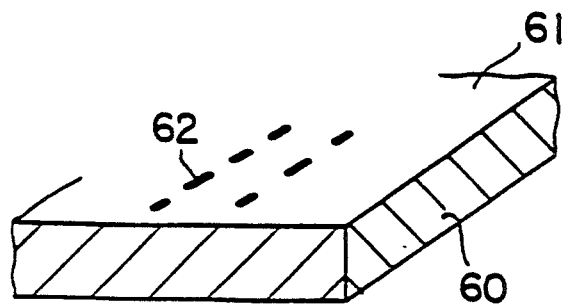
FIGS. 20 and 21 are view showing other examples of conventional optical cards.
Figure 21:
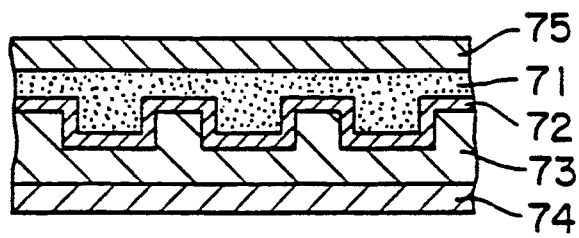
Figure 22:
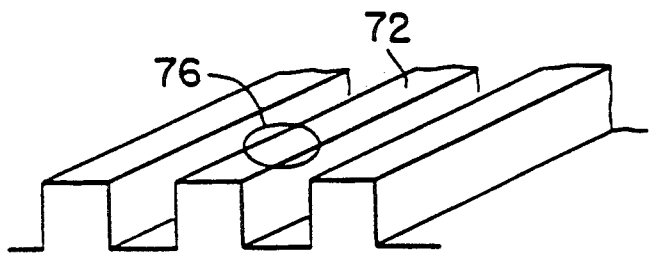
FIG. 22 is a view for illustrating a writing system for FIG. 21.
Figure 23:
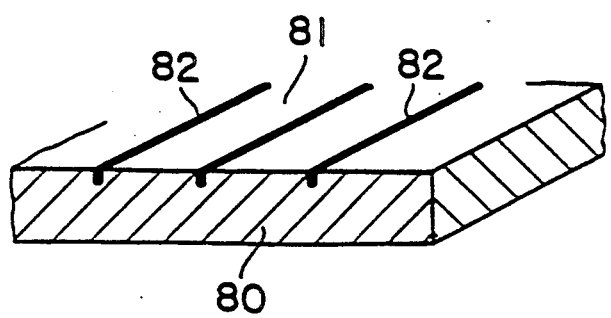
FIG. 23 is a view of showing a further example of a conventional recording medium.

Referring also to mass-duplication, a mother mask 210 is attached to a cylindrical roll 200, as shown in FIG. 18. Then, a resinous solution 201 is coated on a support film fed from a roll 204 and cured by the irradiation of ultraviolet rays from an ultraviolet source 206. Subsequently, a diffraction grating or hologram is transferred and recorded on the resin cured on the support film, which is rolled around a roll 207b. It is therefore possible to mass-produce, e.g., the ROM type of optical cards in continuous rolling-up fashion. It is noted that if the resin is not sufficiently cured by the single light source 206 because of the amount of the resin coated, the properties of the resin and support film and other reason, an additional ultraviolet source 208 may be used for increased curing.

Preparation (VIII)

In the present invention, the optical recording media obtained by the above manufacturing processes (I) to (IX) are used as the original sheets, from which a stamper is prepared by plating, pressing or the like. With such a stamper, optical recording media may be duplicated by injection or hot-pressing techniques or such templating techniques as mentioned above.

Materials for the stamper used to this end may be metals such as Ni, Al, Cu and Cr. On the other hand, while no particular limitation is placed on the resin for duplication, preference is given to a thermoplastic resin esp. in the case of hot-pressing.

In the present invention, use may be made of various holograms such as a Fresnel hologram to be recorded using as material waves Fresnel's diffraction waves transmitting through or reflected off a material and as reference waves resulting from a point light source positioned at any distance from the surface of a photosensitive material; a Fraunhofer hologram to be recorded when waves transmitting through or reflected off a material become Fraunhofer's diffraction waves; an image hologram to be disposed such that a material to be recorded is imaged for recording on a photosensitive material by an imaging optical system such lenses; a rainbow hologram capable of reproducing white light; and a Lippmann hologram designed to irradiate a photosensitive material with material and reference waves from the opposite direction to form interference fringes in the thickness direction of the photosensitive material.

In the foregoing, the portion of low reflectivity forming the information recording area has been described as being formed only by the modulation treatment by the recording of the diffraction grating or hologram. It is understood, however, that other suitable modulation treatments may be used in combination. Referring to FIG. 1 for instance, the portion of low reflectivity of the information recording area may be formed by modulation treatments making use of finely modulated ground glass, and a transparent material having a fine light and shade pattern.

As detailed above, the present invention is not only well-suited for mass-duplication on an industrial scale but also has a marked effect upon reductions in the production cost, because separate information comprising a diffraction grating or hologram is recorded on at least a part of an optical recording medium including an information recording pattern area distinguishable by a difference in light reflectivity, e.g., a portion of low reflectivity of the information recording pattern, so that such sophisticated steps as etching can be avoided to simplify the manufacturing processes as much as possible and the raw materials used are not limited to specific optical recording materials. The present optical recording medium also excels in shelf stability, durability and stability-with-time. Furthermore, the present optical recording medium is effective for preventing counterfeiting by optical procedures, and is so colorful that it may be used as a sort of ornament. Since the diffraction grating or hologram is formed in the same plane as the information pattern, it is impossible to read out the diffraction grating or hologram, even though the information pattern is possibly read out under an electron microscope. Furthermore, since the diffraction grating or hologram is embedded in the recording medium and formed on the same layer as the information pattern, shading-off occurs due to the embedding depth even if optical readout may be possible, thus making a great contribution to fake-proofness. The present recording medium in the form of a card has the additional merit of being not damaged in severe environments.

INDUSTRIAL APPLICABILITY

The optical recording media of the present invention may be used as optical recording materials in various forms such as flexible disks, cards and tapes, and are thus applicable to the following fields.

(1) Metal Distribution Industry: cashing cards, credit cards and prepaid cards.

(2) Medical/Health Industry: medical certificates, medical cards and emergency cards.

(3) Amusements Industry: software media, membership cards, admission tickets, control media for amusements facilities, media for TV games, media for Karaoke and golf score cards.

(4) Traffic/Travel Service Industry: travelers' cards, certificates, commutation tickets, passports and driving record cards.

(5) Publishing Industry: electronic publishing.

(6) Information Processing Industry: external memories of electronic equipment.

(7) Education Industry: teaching aids programs, report card controls, campus cards, ID cards and library administration cards.

(8) Automobile Industry: cards for preparation, operation, service and navigation.

(9) FA: media for recording programs for MC, NC, robots and the like and maintenance parts cards.

(10) Other purposes: building controls, home controls, ID cards, media for automatic vending machines, address cards, cooking cards and employee cards.

What is claimed is:

1. An optical recording medium comprising:
   a substrate; and
   an information recording pattern formed on the substrate, said information recording pattern including a portion of high reflectivity and a portion of low reflectivity, the portion of low reflectivity of the information recording pattern having a diffraction grating or hologram superimposed thereon.

2. An optical recording medium as claimed in claim 1, wherein said information recording pattern includes a diffraction grating, and is formed such that the width of a groove of a part of said diffraction grating is varied.

3. An optical recording medium as claimed in claim 1, wherein said information recording pattern includes a diffraction pattern, and is formed such that the pitch of a portion of said diffraction grating is varied.

4. An optical recording medium as claimed in claim 1, wherein said information recording pattern includes a diffraction grating, and is formed by overlapping parts of said diffraction grating having varied angles.

5. An optical recording medium as claimed in claim 1, which is an optical card.

6. An optical recording medium as claimed in claim 1, which is an optical disk.

7. An optical recording medium as claimed in claim 1, wherein a light reflecting material is laminated on the whole surface or a partial surface of said substrate to cover said information recording pattern area thereby.

8. An optical recording medium as claimed in claim 1, wherein an optical recording material is laminated on the whole surface or a partial surface of said substrate to cover said information recording pattern area thereby.

9. An optical recording medium as claimed in claim 1, wherein at least a part of said hologram is comprised of a type of hologram where the reproduced image appears by the irradiation of a laser beam.

10. An optical recording medium as claimed in claim 1, wherein the portion of low reflectivity of said information recording pattern is formed by exposure to two coherent bundle of rays or object and reference beams.

11. An optical recording medium as claimed in claim 1, wherein the portion of low reflectivity of said information recording pattern is formed by exposure to light through a mask having a regular pattern of a diffraction grating.

12. An optical recording medium as claimed in claim 1, wherein exposure to light is carried out through a single mask having both (a) a pattern of the size of an information bit forming said information recording pattern and 9b) a regular pattern smaller than the size of the information bit forming said information recording pattern.

13. An optical recording medium comprising:
a substrate; and
means for displaying information on said substrate, said means for displaying information including a first information pattern encoded in either an area of first reflectivity or an area of second reflectivity, and a second information pattern encoded in a diffraction grating or hologram formed integrally with said substrate and superimpsoed on said area of first reflectivity.

14. An optical recording medium comprising:
a substrate, said substrate having an information recording area having a first portion of first reflectivity and a second portion of second reflectivity; and
means for inhibiting counterfeiting, said means including a diffraction grating or hologram formed integrally with said substrate and superimposed on said first portion of first reflectivity or said second portion of second reflectivity.

* * * * *